United States Patent [19]

Kohzai et al.

[11] 4,347,471
[45] Aug. 31, 1982

[54] MACHINE TOOL DRIVE MOTOR CONTROL SYSTEM

[75] Inventors: Yoshinori Kohzai; Yoshiki Fujioka; Naoto Ota, all of Hino, Japan

[73] Assignee: Fujitsu Fanuc Limited, Japan

[21] Appl. No.: 103,576

[22] Filed: Dec. 14, 1979

[30] Foreign Application Priority Data

Dec. 16, 1978 [JP] Japan ............................. 53-156760

[51] Int. Cl.³ .............................................. G05B 5/01
[52] U.S. Cl. .................................. 318/616; 318/661; 318/466; 318/467; 318/470
[58] Field of Search ............... 318/656, 657, 658, 659, 318/660, 661, 612, 626, 269, 272, 275, 466, 467, 470, 616, 617, 618

[56] References Cited

U.S. PATENT DOCUMENTS

| | | | |
|---|---|---|---|
| 3,939,389 | 2/1977 | Nopper | 318/657 |
| 4,011,490 | 3/1977 | Daab et al. | 318/467 |
| 4,109,185 | 8/1978 | Froyd et al. | 318/661 |
| 4,132,939 | 1/1979 | Kameyama et al. | 318/467 |

Primary Examiner—J. V. Truhe
Assistant Examiner—Eugene S. Indyk
Attorney, Agent, or Firm—Staas & Halsey

[57] ABSTRACT

A control system for rigidly stopping the spindle of a machine tool at a prescribed angular position when a tool is to be changed, without the use of a mechanical brake. Provided for this purpose is an orientation control circuit adapted to produce an output signal of zero potential when the spindle is at a prescribed stopping position, and an output signal of a potential proportional to the amount of angular deviation when the spindle is displaced from the prescribed stopping position. To stop the spindle at a prescribed stopping position, the output signal from the orientation control circuit is delivered in place of a speed command signal to a speed control loop of the type which limits to zero the difference between the speed command signal and a speed feedback signal. When the spindle is at rest, the feedback function of the speed control loop holds the rotary shaft of the spindle motor rigidly at the stopping position as if a mechanical brake were applied thereto.

5 Claims, 10 Drawing Figures

MACHINE TOOL DRIVE MOTOR CONTROL SYSTEM

BRIEF SUMMARY OF THE INVENTION

This invention relates to a spindle drive motor control system in a machine tool automatically controlled by a numeric control unit.

There are many cases wherein the interior of a workpiece is machined by a boring tool which is inserted into a hole that has already been provided in the workpiece by a previous step. In performing a boring operation of this type, it is essential that the rotor shaft of the spindle motor be stopped firmly at a prescribed angular position when the boring tool is first inserted into the narrow hole and when it is withdrawn from the hole at the completion of boring. If this condition is not met the boring tool will contact the side of the hole and thus damage the workpiece. It is therefore conventional practice to detect the position at which the spindle should stop by means of a photoelectric detector or a limit switch mechanism, and then apply a mechanical brake to the spindle to stop it at the prescribed position in response to the detection signals issued by the detection means. However, since the conventional apparatus of the type described employs a mechanical brake, prolonged use results in brake shoe wear that eventually makes it impossible to stop the spindle at the prescribed position, thus allowing the blade of the boring tool to contact the wall of the hole. In other words, the conventional apparatus is disadvantageous in that high precision cannot be maintained over an extended period of time.

On the other hand, a numerically controlled machine tool makes use of a paper tape on which instructions relating to the positioning of a tool with respect to a workpiece are provided in the form of numerical command values to control the position of a table on which the workpiece is secured or the position of the tool itself, in such a manner that the tool will always be correctly positioned with respect to the workpiece. In controlling the machine tool in this fashion, a certain reference point on the workpiece is chosen at the origin or "home" position, and the workpiece is then secured to the table in an accurate manner. Thereafter, the blade edge of the cutting tool mounted on the spindle is aligned with the origin of the workpiece, at which position a counter in the numeric control unit is reset to zero, and then the information on the numeric control tape (NC tape) is read into a memory to preset the numerical command values. A START button is then depressed to effect the positioning operation, and machining begins when the positioning has been completed.

The reference point mentioned above is set at the center of a small, round hole formed in the workpiece. Accordingly, when aligning the tip of the cutting tool blade mounted on the spindle with the origin (reference point), the tip of the cutting tool blade is first temporarily set within the circular hole of the workpiece. Then the spindle or the workpiece is moved in the X-direction until the blade edge contacts the periphery of the hole, and the amount of movement is stored in the memory as a value $X_1$. The tip of the cutting tool is then returned to the temporary position at the center of the hole. Once this has been accomplished the spindle is rotated by 90 degrees to orient the cutting blade in the Y-direction, and the spindle or workpiece is then moved in the Y-direction until the cutting blade contacts the periphery of the round hole. The amount of movement is stored in the memory as a value $Y_1$ and the blade returned again to the temporary position. This operation is repeated in the -X and -Y directions as well to compute the respective distances to the periphery of the hole. The reference point is set by calculating the arithmetic mean of the four distances obtained as described above, with respect to the X- and Y-directions.

For the above operation to succeed, it is necessary that the 90-degree rotation of the spindle be performed with accuracy, and that the spindle be stopped firmly at the assigned position. However, the conventional apparatus employs photoelectric detectors or limit switches as described above and stops the spindle by applying a mechanical brake, so that it is still not possible to avoid the foregoing problem in which high precision cannot be maintained.

It is therefore an object of the present invention to provide a machine tool drive motor control system of the type in which a mechanism functions to stop the motor of a machine tool at a prescribed angular position, the system being adapted to stop the motor firmly at the prescribed angular position without resorting to the use of a mechanical brake.

It is another object of the present invention to provide a machine tool drive motor control system which is capable of firmly stopping a controlled motor at a prescribed angular position through the use of a speed control loop which reduces the difference between a speed command signal and a speed feedback signal to zero.

It is a further object of the present invention to provide a machine tool drive motor control system which is capable of firmly stopping a controlled motor selectively at stopping positions arrayed at rotational angles of 90 degrees, through the use of a speed control loop which reduces the difference between a speed command signal and a speed feedback signal to zero.

Other and further objects, features and advantages of the present invention will appear more fully from the following description.

BRIEF DESCRIPTION OF THE DRAWINGS

The present invention will be more clearly understood by referring to the following detailed description when considered in conjunction with the accompanying drawings wherein:

FIGS. 5 A through J are waveform diagrams illustrating waveforms associated with the block diagram of FIG. 4;

FIGS. 7 A through C are waveform diagrams showing the timing relationships among the output of the orientation control circuit, the speed of a DC motor, and an orientation command signal;

FIGS. 10 A through D are diagrams useful in explaining stopping position orientations.

DETAILED DESCRIPTION OF THE INVENTION

Figure 1:
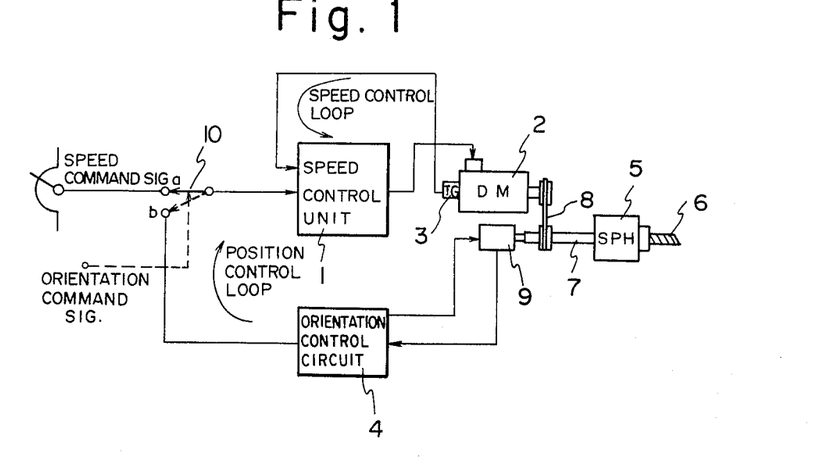
FIG. 1 is a system block diagram of an embodiment in accordance with the present invention.

A detailed description of the present invention will now be had with reference to the drawings, beginning first with FIG. 1 which shows a system block diagram of an embodiment for stopping the spindle of a machine tool at a prescribed position. The system includes a speed control unit 1, a DC motor 2, a tachogenerator 3 for detecting the speed of the DC motor 2, and an orientation control circuit 4. The construction of these components will be described hereinafter. The system further includes a spindle head 5 for mounting a tool 6, the spindle head having a spindle shaft 7 connected to the motor 2 via a belt 8, a resolver 9 which is connected directly to the spindle shaft 7, and a change-over switch 10.

When machining a workpiece with the tool 6, the movable contact of the switch 10 is switched over to a stationary contact a to allow a speed command voltage to be applied to the speed control unit 1. The control unit causes the DC motor 2 to rotate so that the tachogenerator 3 responds by delivering an output signal which is fed back to the input side of the control unit. This forms a speed control loop within which the DC motor 2 rotates at a speed determined by the speed command voltage.

When the DC motor 2 is to be stopped following completion of machining, the speed command voltage is removed and the motor is brought to a stop by electrical braking, but an orientation command signal is impressed upon the change-over switch 10 immediately before the motor stops so that the movable contact is switched over to a stationary contact b.

This forms a position control loop in which the output of resolver 9 serves as a position detection signal.

Figure 2:
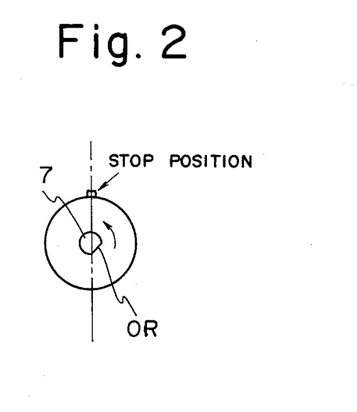
FIGS. 2 and 3 are diagrams useful in describing a spindle stopping operation.
Figure 3:
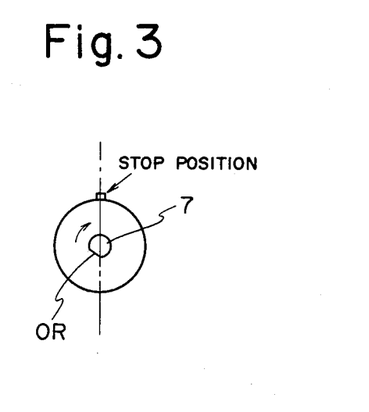

Thus, when the orientation command signal is delivered, the spindle shaft 7 will rotate in the counterclockwise direction, if the reference point OR of spindle shaft 7 is positioned as shown in FIG. 2, to bring the reference point OR to a stopping position, at which time the orientation control circuit 4 issues a ZERO signal that stops the spindle shaft 7 at this position. The position control loop functions to firmly retain the spindle shaft at this position. On the other hand, if a reference point OR is positioned as shown in FIG. 3, the spindle shaft 7 will rotate in the clockwise direction to bring the reference point OR to the stopping position. The operation then proceeds in the same manner as described above, with the position control loop functioniong to retain the spindle shaft at the prescribed stopping position. According to a feature of the present invention, it is also possible to provide four stopping positions at a 90-degree pitch, and the spindle shaft 7 can be stopped selectively at any one of these positions at the time of an orientation command. This will be described below in more detail.

Figure 4:
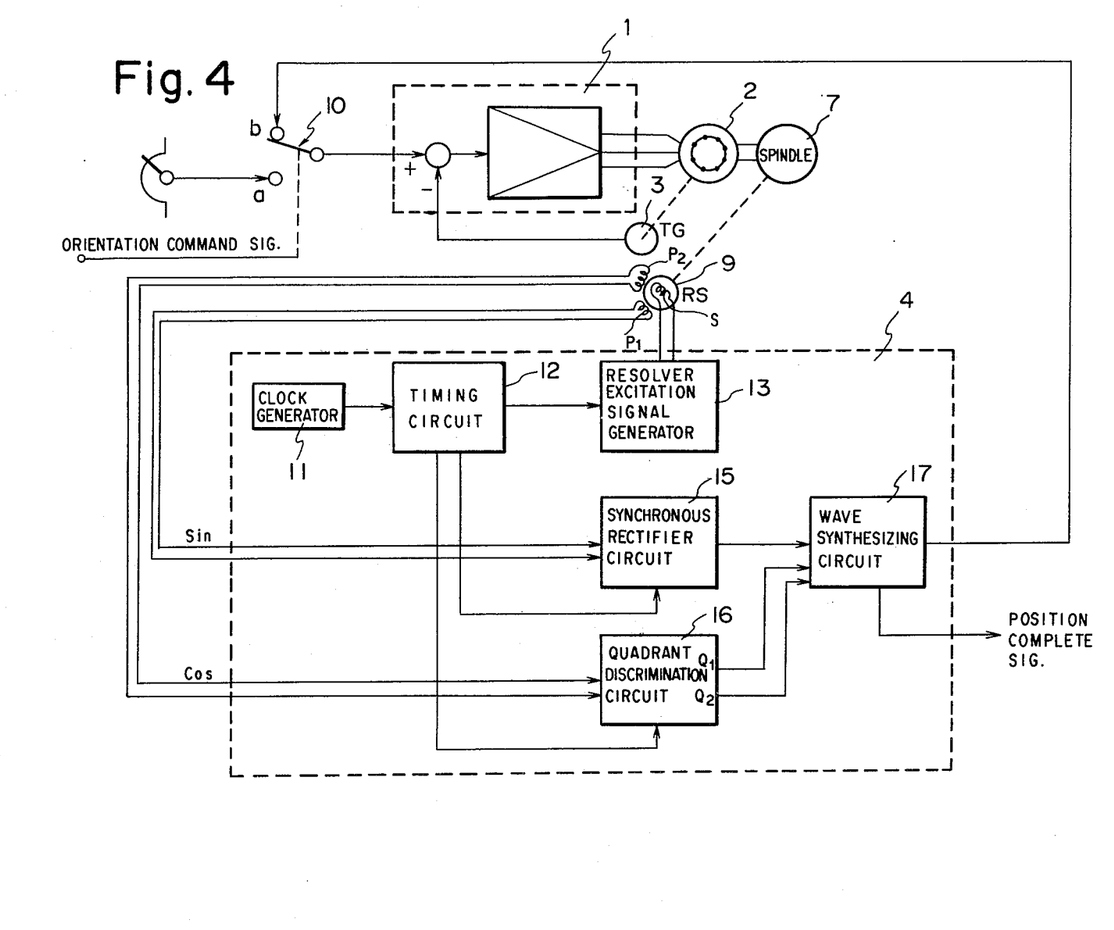
FIG. 4 is a block diagram showing a first embodiment of an orientation control circuit.

Illustrated in FIG. 4 is a block diagram showing the construction of the orientation control circuit 4 in detail. The control circuit comprises a clock generator 11, timing circuit 12, resolver excitation signal generator 13, synchronous rectifier circuit 15, a quadrant discrimination circuit 16, and a wave synthesizing circuit 17.

The operation of the present invention will now be described with particular emphasis on the function of the orientation control circuit 4.

Figure 5:
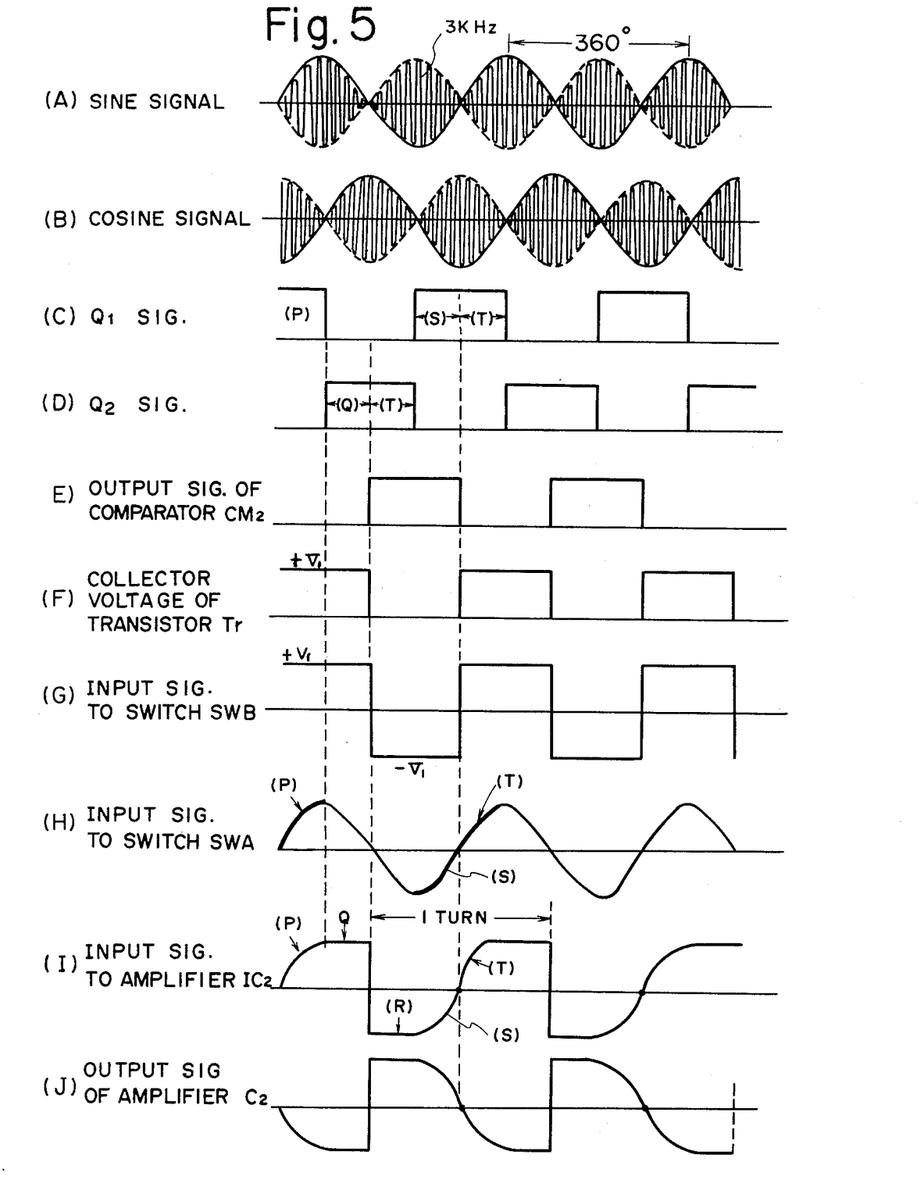

The clock generator 11 produces a clock signal having a rectangular waveform and an oscillation frequency of normally 3 KH$_Z$. The resolver excitation signal generator 13 receives the clock signal via the timing circuit 12 and produces a resolver excitation signal, comprising a 3 KH$_Z$ sine wave, that is applied to the secondary winding S (rotor winding) of the resolver 9. Impressing the 3 KH$_Z$ sine wave upon the secondary winding S causes a primary winding P$_1$ of the resolver to produce a 3 KH$_Z$ "sine" signal whose peak value varies in proportion to the sine of the angular position of the rotor shaft of resolver 9, and causes a primary winding P$_2$ of the resolver to similarly produce a 3 KH$_Z$ "cosine" signal whose peak value varies in proportion to the cosine of the angular position of the resolver rotor shaft, the sine and cosine signals having the same phase. The sine and cosine signals produced by the primary windings P$_1$, P$_2$ are designated A and B in FIG. 5, respectively. According to the present invention, the orientation control circuit 4 produces a STOP signal of zero potential when a rotational position signal in the shape of a sine wave (designated by the thick line in FIG. 5A) is at the zero potential level, and a quadrant discrimination signal in the shape of a cosine wave (designated by the thick line in FIG. 5B) is at its maximum positive value, the rotational position signal being obtained by the synchronous rectification (detection) of the sine signal from the primary winding P$_1$, and the quadrant discrimination signal by the synchronous rectification (detection) of the cosine signal from the primary winding P$_2$. The operation of orientation control circuit 4 up until the zero-potential STOP signal is delivered from its wave synthesizing circuit 17 will now be described.

The sine signal produced by primary winding P$_1$ and shown in FIG. 5A is applied to synchronous rectification circuit 15 which synchronously rectifies the sine signal by means of the 3 KH$_Z$ clock signal from timing circuit 12 so as to provide the rotational position signal (the thick, solid-line waveform in FIG. 5A) that varies in the manner of a sine wave in accordance with the rotation of spindle shaft 7, the rotational position signal being delivered to wave synthesizing circuit 17. The cosine signal produced by primary winding P$_2$ is applied to quadrant discrimination circuit 16 and is similary synchronously rectified (detected) within the circuit to provide the quadrant discrimination signal which varies in the manner of a cosine wave, as shown by the thick line in FIG. 5B, in accordance with the rotation of the spindle shaft 7. The quadrant discrimination circuit 16, on the basis of the quadrant discrimination signal which it has produced, then produces a rectangular wave as shown in FIG. 5C, as well as a rectangular wave delayed in phase by 180 degrees with respect thereto as shown in FIG. 5D, both of these rectangular signals being delivered to wave synthesizing circuit 17 as switching signals.

Figure 6:
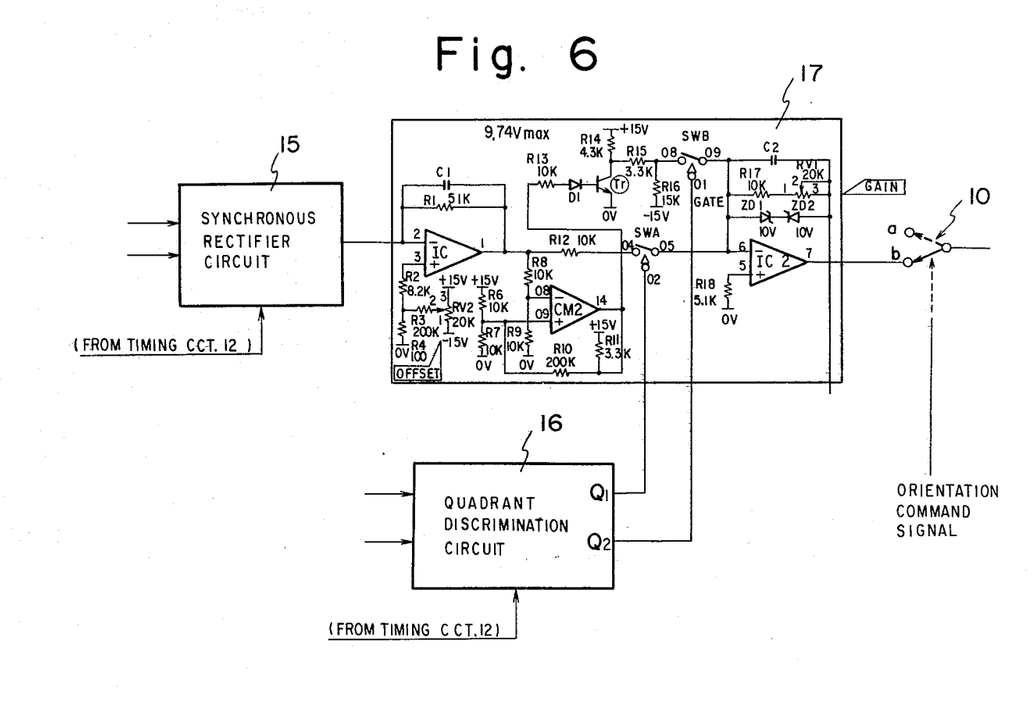
FIG. 6 is a circuit diagram of a wave-synthesizing circuit.

For a fuller understanding of wave synthesizing circuit 17, reference will now be had to FIG. 6, which shows the construction of the circuit in detail. Output signals Q$_1$, Q$_2$ from quadrant discrimination circuit 16 described above are applied to the drive section of respective switches SWA, SWB located in wave synthesizing circuit 17, whereby the switches SWA, SWB are opened or closed owing to the rectangular shape of the input signals. On the other hand, the sine wave-shaped rotational position signal applied to wave synthesizing circuit 17 passes through an amplifier IC$_1$ and reaches switch SWA in the form illustrated in FIG. 5H. A comparator $CM_2$ receives the output of amplifier $IC_1$ and produces an output signal, having the shape shown in FIG. 5E, that is applied to a transistor Tr to gate the transistor ON or OFF. The operation of transistor Tr can be understood from FIG. 5F which shows the collector voltage. The input side of switch SWB is connected to power sources of $+V_1$ and $-V_1$ through resistors $R_{14}$, $R_{15}$, and $R_{16}$, so that $+V_1(V)$ is connected to the input side of switch SWB when transistor Tr is OFF, while there will be a shift to $-V_1(V)$ when transistor Tr is ON. The condition at the input to switch SWB is depicted in FIG. 5G.

The shape of the input signal at the minus input terminal of amplifier $IC_2$ is shown in FIG. 5I. For a fuller understanding of this waveform assume that the outputs $Q_1$, $Q_2$ of quadrant discrimination circuit 16 attain logic levels of "1" and "0," respectively. The P portion of the waveform in FIG. 5I thus corresponds to the P portion of the waveform in FIG. 5H which appears at the minus input terminal of amplifier $IC_2$ during the period that switch SWA is closed (the interval P in FIG. 5C). The outputs $Q_1$, $Q_2$ then go to logic "0" and logic "1," respectively, switch SWB closes, and transistor Tr is turned OFF. During this period (interval Q in FIG. 5D) the potential $+V_1(V)$ appears at the input to switch SWB and is therefore applied to amplifier $IC_2$ (the Q portion of the waveform in FIG. 5I). With switch SWB still closed, transistor Tr becomes conductive so that the potential at the input to switch SWB drops sharply from $+V_1$ to $-V_1$, the $-V_1$ potential appearing at the switch input, and hence at the input to amplifier $IC_2$ (the R portion of the waveform in FIG. 5I), during the period that transistor Tr is ON (interval R in FIG. 5D). Switch SWB is then opened and, with transistor Tr remaining conductive, switch SWA is closed. Thus, during the interval S in FIG. 5C, which is the period over which switch SWA is closed while transistor Tr continues to conduct, the S portion of the waveform in FIG. 5H appears intact at the input to switch SWA, and this is applied to amplifier $IC_2$ (the S portion of the waveform in FIG. 5I). This state continues while the rotor shaft of the resolver rotates through 90 degrees, and transistor Tr is then turned OFF. Moreover, since siwthc SWA remains closed and switch SWB open, the T portion of the waveform in FIG. 5H at the input to switch SWA is applied to the input of amplifier $IC_2$ (the T portion of the waveform in FIG. 5I) during the interval T in FIG. 5C. Thus, in the transition from the S portion to the T portion in FIG. 5I, the potential at the input terminal to amplifier $IC_2$ traverses the zero potential line, and it is this zero voltage signal that is employed as an orientation signal as will be described hereinafter. Next, when switch SWA is opened and switch SWB closed, the $+V_1$ potential again appears at the input to amplifier $IC_2$ so that the input waveform at this time is identical with the portion Q in FIG. 5I. It thus can be understood that only one zero voltage signal appears for each revolution of resolver 9. Finally it should be noted that the input to amplifier $IC_2$ is inverted thereby and appears at the output terminal as the signal shown in FIG. 5J.

Figure 7:
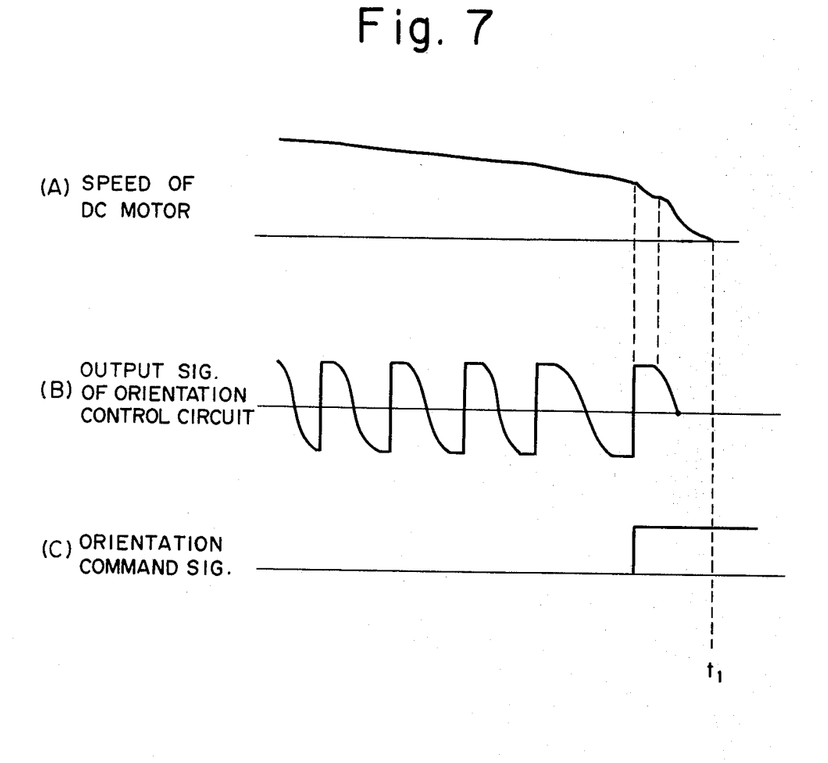

Reference will now be had to FIG. 7 to again describe how the spindle shaft 7 is stopped at the prescribed stopping position.

When it is desired to change a machine tool, a stop instruction is applied to DC motor 2 whose speed therefore starts to decrease in a gradual manner, as shown in FIG. 7A. At this stage, the orientation control circuit 4 is operative to produce the signal shown in FIG. 7B since the resolver 9 rotates together the spindle 7. However, as no orientation command has yet been delivered, switch 10 is open so that the position control loop cannot be established. Then, when an orientation command signal as shown in FIG. 7C is supplied immediately before DC motor 2 stops, switch 10 is switched over to contact b to break the speed control loop and form the position control loop in its place. As a result, DC motor 2 is guided in the direction that brings the output signal of orientation control circuit 4 to zero. Thus, the output of orientation control circuit 4 becomes zero when the spindle is so oriented that it has reached the prescribed stopping position at time $t_1$, and the DC motor 2 and spindle come to rest at the prescribed position. Thereafter, the position control loop functions to firmly preserve the orientation of the DC motor, that is, the orientation of the spindle shaft 7.

The embodiment discussed above stops the spindle shaft at only one angular orientation, such as at an angular position of 0 degrees. In another embodiment of the present invention, as will now be described, four spindle stopping positions are provided at an angular pitch of 90 degrees, and the spindle shaft can be stopped selectively at any prescribed one of these positions by means of a command signal.

Figure 8:
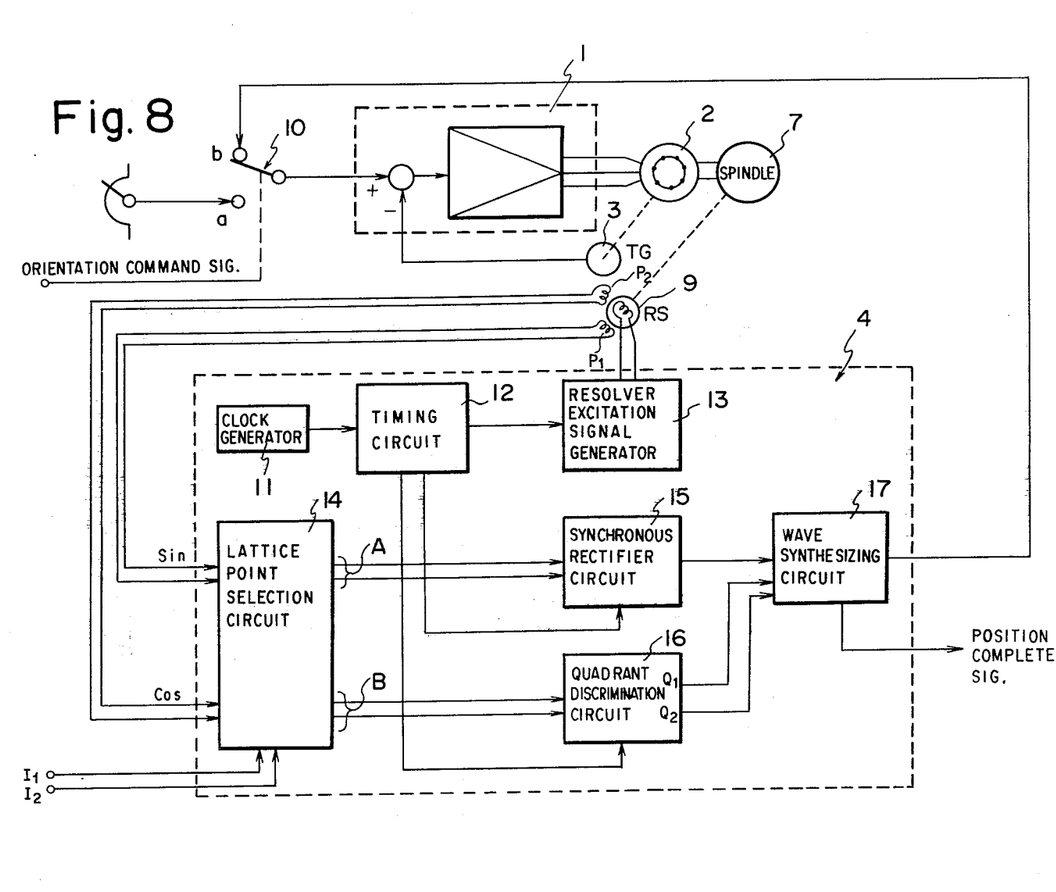
FIG. 8 is a system block diagram showing a second embodiment of an orientation control circuit.

This second embodiment is illustrated in the block diagram of FIG. 8, wherein a lattice point selection circuit is designated generally at 14. All other portions are identical with those of the arrangement in FIG. 4 and are denoted by the same reference numerals. These portions need not be described again here.

Figure 9:
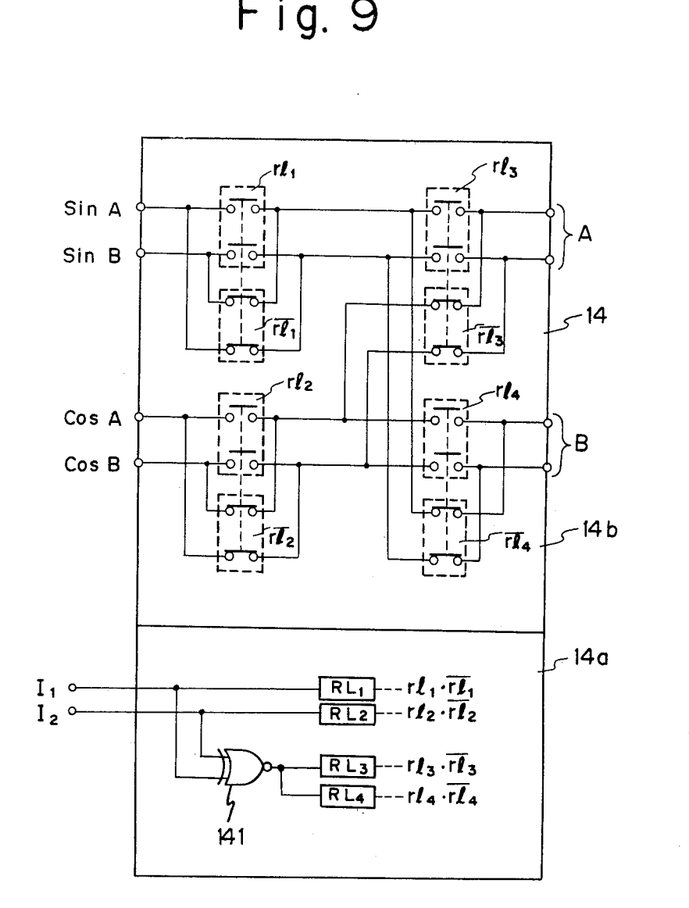
FIG. 9 is a circuit diagram of a lattice point selection circuit.

FIG. 9 is a detailed circuit diagram of lattice selection circuit 14 which comprises a drive section 14a and circuit switching section 14b. The drive section 14a comprises an exclusive OR gate 141 and relay drive circuits $RL_1$, $RL_2$, $RL_3$, $RL_4$. The circuit switching section 14b comprises contacts $rl_1$, $\overline{rl}_1$ actuated by relay drive circuit $RL_1$, contacts $rl_2$, $\overline{rl}_2$ actuated by relay drive circuit $RL_2$, contacts $rl_3$, $\overline{rl}_3$ actuated by relay drive circuit $RL_3$, and contacts $rl_4$, $\overline{rl}_4$ actuated by relay drive circuit $RL_4$. Each relay drive circuit RL is adapted to make the contact rl and break the contact $\overline{rl}$ when the input signal is at logic "1," and to break the contact rl and make the contact $\overline{rl}$ when the input signal is at logic "0." The following table shows the relationship between lattice point selecting command signals $I_1$, $I_2$, which indicate the stopping position orientations applied to spindle shaft 7, and the signals applied to the respective relay drive circuits RL.

| STOPPING POSITION ORIENTATION | LATTICE POINT SELECTING COMMAND SIGNALS | | SIGNALS APPLIED TO RELAY DRIVE CIRCUITS | | | |
|---|---|---|---|---|---|---|
| | $I_1$ | $I_2$ | $RL_1$ | $RL_2$ | $RL_3$ | $RL_4$ |
| 0 | 1 | 1 | 1 | 1 | 1 | 1 |
| 90 | 1 | 0 | 1 | 0 | 0 | 0 |
| 180 | 0 | 0 | 0 | 0 | 1 | 1 |
| 270 | 0 | 1 | 0 | 1 | 0 | 0 |

Circuit switching portion 14b in lattice point selection circuit 14 performs a switching operation in accordance with the applied lattice point selecting command signals. Thus, when the stopping position orientation is 0 degrees, the output from primary winding $P_1$ of resolver 9 appears intact at the output terminals A, and the output from primary winding $P_2$ appears intact at output terminals B. When the stopping position orientation is 90 degrees, the output from primary winding $P_1$ appears at output terminals B, and the output from primary winding $P_2$ appears at output terminals A although inverted in phase. When the stopping position orientation is 180 degrees, the output from primary winding $P_1$ appears at output terminals A and the output from primary winding $P_2$ at output terminals B, the signals at both output terminals being inverted in phase. When the stopping position orientation is 270 degrees, the output from primary winding $P_1$ appears at output terminals B although inverted in phase, and the output from primary winding $P_2$ appears intact at output terminals A.

Figure 10:
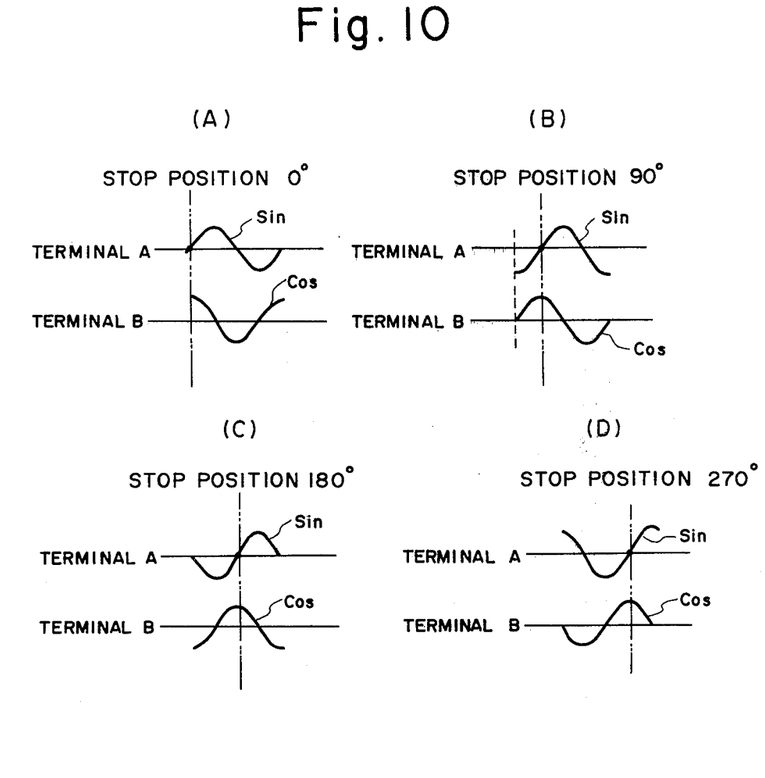

Shown in FIG. 10 are the phase relationships between the envelope curves of the 3 $KH_Z$ sine and cosine signals, that is, between the rotational position and quadrant discrimination signals which are synchronously rectified signals from among the outputs of primary windings $P_1$, $P_2$ of resolver 9 as obtained from output terminals A, B of lattice point selection circuit 14. The relationships illustrated in FIG. 10 are for when the stopping position orientation is 0 degrees (A), 90 degrees (B), 180 degrees (C), and 270 degrees (D).

In the present embodiment, as in the embodiment described above, the orientation control circuit 4 delivers a stop signal of zero potential when the peak value of a rotational position signal included in the sine signal from output terminal A is zero and the peak value of a quadrant discrimination signal included in the cosine signal from output terminal B attains its maximum positive value.

In the foregoing two embodiments, the resolver 9 must be connected directly with spindle 7 in view of belt slippage if a belt is used to interconnect the DC motor 2 and spindle 7. However, if gears are used for the DC motor-spindle coupling, the resolver may be connected directly to the rotary shaft of the DC motor.

In accordance with the present invention as described above, a spindle can be stopped reliably not by a mechanically brake but by an electrical braking system. This affords an extremely stable spindle stopping operation at all times and over an extended period since absolutely no frictional portions are involved, and precludes stopping errors that often result from mechanical slippage. Moreover, since the essential circuitry also utilizes a large portion of the circuitry that constitutes the speed control loop, the orientation control circuit need not possess a large quantity of specialized circuitry. This is not only economical but also assures a high positioning accuracy owing to the use of the position control loop. Connecting the resolver directly to the spindle makes possible a positioning accuracy of less than +0.1 degrees even if blind sectors of gears are considered.

As many apparently widely different embodiments of this invention may be made without departing from the spirit and scope thereof, it is to be understood that the invention is not limited to the specific embodiments thereof except as defined in the appended claims.

What we claim is:

1. An improved control system for a machine tool of the type including a motor for driving the spindle of the machine tool, said motor being controlled by a control unit in a speed control loop for limiting to zero the difference between a speed command signal and a speed feedback signal, wherein the improvement comprises:

positioning means for generating a position feedback signal for the input of said control unit to rigidly stop said spindle at a predetermined angular position occurring once per 360 degrees of rotation of said spindle, said positioning means including
a resolver operationally connected to said spindle and having a secondary winding which receives an excitation signal and two primary windings which generate sine and cosine signals in response thereto; and
orientation control circuit means responsive to the sine and cosine signals from said resolver for synthesizing said position feedback signal, said position feedback signal comprising a monotonically changing function of angular deviation from said predetermined angular position, which function is symmetrical with respect to the points at which the deviation becomes zero.

2. A control system according to claim 1, in which said orientation control circuit means comprises a clock generator, a timing circuit responsive to the signals generated by said clock generator, a resolver excitation signal generator circuit responsive to the signals generated by said clock generator, a synchronous rectifier circuit responsive to said sine signals generated by said resolver and to the signals generated by said timing circuit, a quadrant discriminator circuit responsive to the cosine signals generated by said resolver and to the signals generated by said timing circuit, and a wave synthesizing circuit responsive to the signals generated by said synchronous rectifier circuit and to the signals generated by said quadrant discrimination circuit.

3. An improved control system for a machine tool of the type including a motor for driving the spindle of a machine tool, said motor being controlled by a control unit in a speed control loop for limiting to zero the difference between a speed command signal and a speed feedback signal, wherein the improvement comprises:

positioning means for generating a position feedback signal for the input of said control unit to rigidly stop said spindle at a predetermined angular position selected from among positions occurring once every 90 degrees of rotation of said spindle, said positioning means including
a resolver operationally connected to the spindle and having a secondary winding which receives an excitation signal and two primary windings which generate sine and cosine signals in response thereto; and
orientation control circuit means responsive to the sine and cosine signals from said resolver for synthesizing said position feedback signal, said position feedback signal comprising a monotonically changing function of angular deviation from said predetermined angular position, which function is symmetrical with respect to the points at which the deviation becomes zero, said orientation control circuit means additionally comprising means for switching between the sine and cosine signals to allow selection of points at which the deviation becomes zero for every 90-degree rotation of said resolver.

4. A control system according to claim 3, in which said orientation control circuit means comprises a clock generator, a timing circuit responsive to the signals from said clock generator, a resolver excitation signal generator circuit responsive to the signals from said clock generator, a lattice point selection circuit responsive to said sine and cosine signals from said resolver and having first and second output ports, a synchronous rectifier circuit responsive to the signals from said first output port of said lattice point selection circuit and to the signals generated by said timing circuit, a quadrant discriminator circuit responsive to the signals from said second output port of said lattice point selection circuit and to the signals generated by said timing circuit, and a wave synthesizing circuit responsive to the signals generated by said synchronous rectifier circuit and to the signals generated by said quadrant discrimination circuit.

5. A control system according to claim 4, in which said lattice point selection circuit comprises switching circuit means for switching between sine and cosine signals applied thereto, wherein said switching circuit means performs a selective switching operation to limit a rotational position signal to zero potential and raise a quadrant discrimination signal to a maximum positive potential at points for stopping said spindle.

* * * * *

UNITED STATES PATENT AND TRADEMARK OFFICE
CERTIFICATE OF CORRECTION

PATENT NO. : 4,347,471

DATED : August 31, 1982

INVENTOR(S) : Kohzai et al.

It is certified that error appears in the above-identified patent and that said Letters Patent is hereby corrected as shown below:

Col. 1, line 43, "at" should be --as--.

Col. 2, line 68, "," should be --;--.

Col. 3, line 40, "counterclock-" should be --counter-clock- --

Col. 5, line 45, "siwthc" should be --switch--.

Col. 7, line 42, "chanically" should be --chanical--.

Signed and Sealed this

Twenty-second Day of February 1983

[SEAL]

Attest:

GERALD J. MOSSINGHOFF

Attesting Officer

Commissioner of Patents and Trademarks